No. 606,917. Patented July 5, 1898.
H. P. DAVIS.
ELECTRIC BRAKE.
(Application filed Oct. 22, 1897.)
(No Model.) 2 Sheets—Sheet 1.
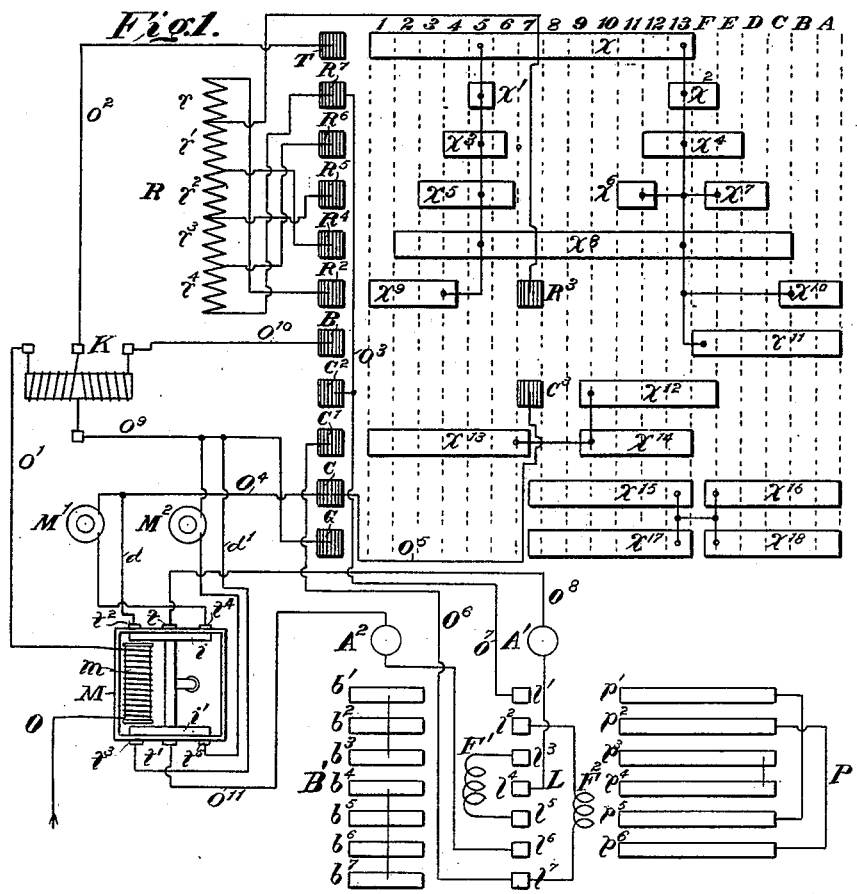
WITNESSES:
INVENTOR
Harry P. Davis
BY
Keley G. Carr
ATTORNEY.

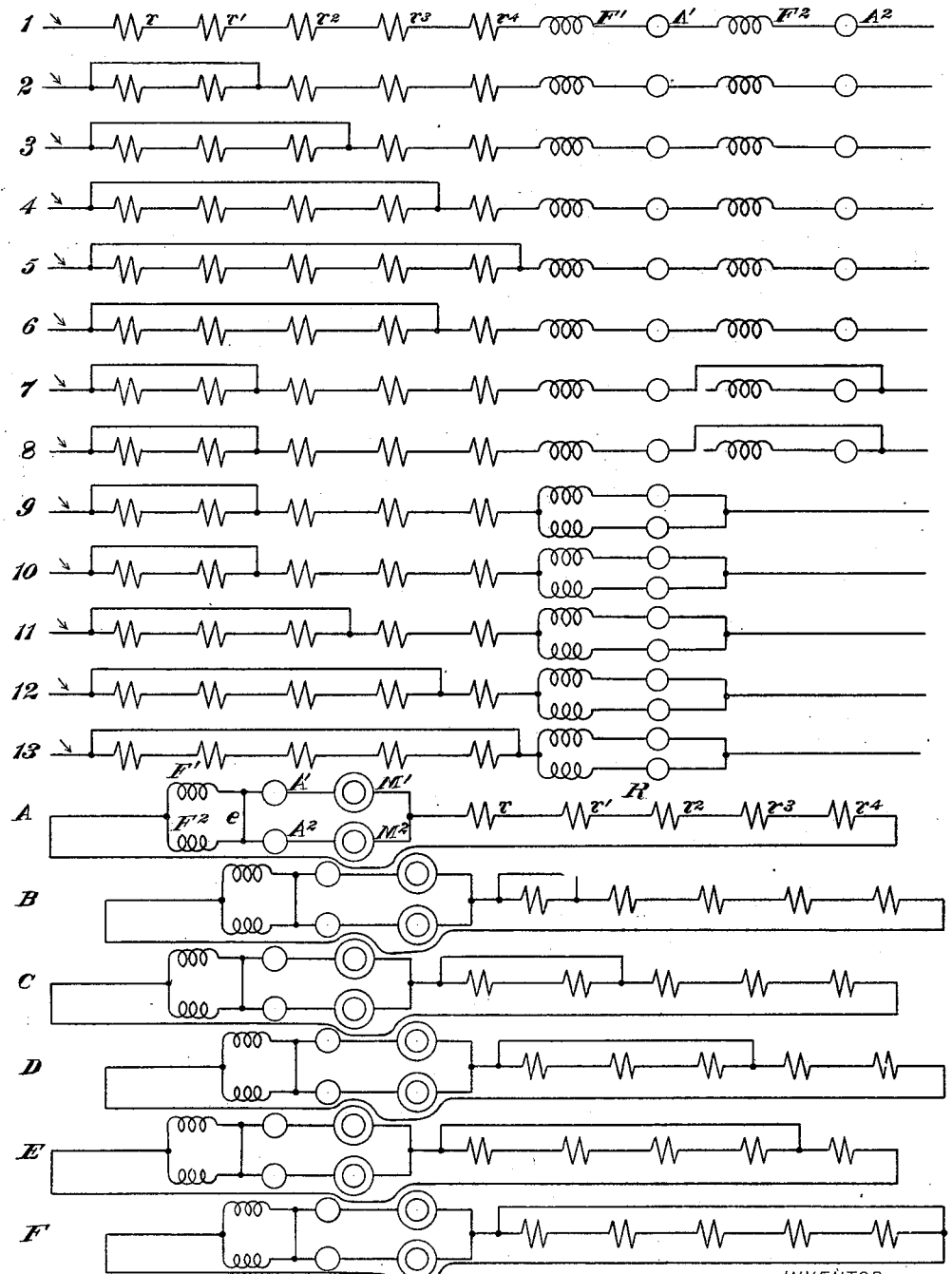

ively than has been possi-

UNITED STATES PATENT OFFICE.

HARRY P. DAVIS, OF PITTSBURG, PENNSYLVANIA, ASSIGNOR TO THE WESTINGHOUSE ELECTRIC AND MANUFACTURING COMPANY, OF PENNSYLVANIA.

ELECTRIC BRAKE.

SPECIFICATION forming part of Letters Patent No. 606,917, dated July 5, 1898.

Application filed October 22, 1897. Serial No. 656,023. (No model.)

*To all whom it may concern:*

Be it known that I, HARRY P. DAVIS, a citizen of the United States, residing in Pittsburg, in the county of Allegheny and State of Pennsylvania, have invented a new and useful Improvement in Electric Brakes, (Case No. 756,) of which the following is a specification.

My invention relates to mechanism for controlling the operation of electrically-propelled vehicles, and particularly to electrically-operated braking mechanism for such vehicles.

The object of my invention is to provide means whereby apparatus of the character specified may be controlled more readily and operated more effectively than has been possible with apparatus which has heretofore been generally employed for this purpose.

I have found in practice that under certain conditions of operation—as, for example, when the rails are wet or coated with mud, ice, or snow and current is applied to brake-magnets connected in series with a plurality of motors acting as generators—one of the brake-shoes is liable to stick, and thus completely stop the revolution of the corresponding truck-wheels. If the controller is thrown to the emergency braking position, this liability is particularly great. While this condition will stop the supply of current from the armature geared to the wheels that have ceased to revolve, the other armature will furnish current to both brake-magnets, and thus serve to prevent any rotation of the sliding wheels. It will be readily seen that under such conditions no control whatever can be had over the sliding wheels either electrically or by means of a hand-brake. I propose to obviate this difficulty by placing a brake-magnet in each armature-circuit. Then if one pair of wheels is prevented from revolving by reason of excessive friction of the corresponding brake and lack of friction between the wheels and the rails the corresponding armature will not only cease to supply current to its brake-magnet, but the armature of the other motor will supply current to said magnet which will be opposite in direction to the magnetizing-current normally supplied to it. The brake-shoe will thus be demagnetized and the wheels released. The released wheels will then begin to revolve and cause the corresponding armature to supply magnetizing-current to its brake-magnet. If the brake should again stick, this operation would be repeated and the car be thus kept under perfect control. I provide also an automatic demagnetizing-switch which serves to throw the brake-magnets into circuit when the power-current is shut off and to cut them out of circuit when the power-current is again supplied to the motors.

In the accompanying drawings, Figure 1 is a diagram of an electrically-propelled car equipment containing my invention. Fig. 2 is a side elevation of the demagnetizing-switch forming a part of the equipment shown in Fig. 1, the inclosing casing or box of the switch being in section. Fig. 3 is a plan view of the demagnetizing-switch and its box, the cover of the latter being removed. Fig. 4 is a diagram of the circuits corresponding to the various positions of the controller-drum.

Referring particularly to Figs. 1, 2, and 3, the surface of the controller-drum is shown as developed into a plane, the working positions on the same being indicated by the spaces between the broken lines. The spaces designated by numerals 1 to 13 are the operative positions on the power side of the controller-drum, and the spaces designated by the letters A, B, C, D, E, and F are the operative positions on the brake side of such drum. The contact-fingers G, C, C', C², B, R², R⁴, R⁵, R⁶, R⁷, and T, which will be hereinafter designated as the "main stationary contact-fingers," coöperate, respectively, with the contact-strips $x$ to $x^{18}$ on the drum in horizontal alinement therewith. The contact-fingers C³ and R³ also respectively engage and coöperate with the strips $x^{12}$ and $x^9$ $x^{10}$ on the drum and will hereinafter be designated as "auxiliary stationary contacts." Permanent electrical connections are provided between certain of the drum contact-strips, as is usual in devices of this character, these connections being clearly indicated in the drawings.

It will be readily seen that the relative positions of the main and auxiliary contact-fingers are such that when the former are in position 1 on the drum the latter will be in position 9 and that when the former are in position A the latter will be in position 5, there being a vacant space on the drum between positions 1 and A substantially equal in width to three of the spaces designated by the reference letters and numerals. If this relation be borne in mind, the circuits corresponding to the various positions of the drum may be traced without difficulty.

A set of supplemental stationary contact-fingers L (individually designated as $l'$ to $l^7$) and two sets of movable contacts P and B' (respectively designated individually as $p'$ to $p^6$ and $b'$ to $b^7$) are also employed for the purpose of securing the desired relation of motors and coöperating apparatus. The contacts P and B' are preferably in the form of strips and mounted upon a drum, which is either rigidly attached to the shaft of the main drum or is geared thereto in any usual and well-known manner, so that the contact-fingers L and the strips P will be in engagement when the main drum is in position to supply line-current to the motors and so that the contact-fingers L and the strips B' will be in engagement when the main drum is in any one of the braking positions. The contact-strips of each set are permanently connected electrically, as is indicated in the drawings.

The resistance R for the circuits is rendered variable by dividing it into five parts or sections $r$, $r'$, $r^2$, $r^3$, and $r^4$, as is usual in equipments of this general character. A blow-out magnet K may also be employed, if desired.

The two motor field-magnets forming parts of the equipment are designated as F' and F² and the corresponding motor-armatures as A' and A². M' and M² are the brake-magnets, which are respectively in circuit with the armatures A' and A².

When the controlling-drums are in any one of the braking positions, a local circuit is established which contains two parallel branches, each of which contains a motor and a corresponding brake-magnet. An equalizing-wire connects the branches between the field-magnets and the armatures, and the connections between corresponding ends of the branches also have equalizing functions.

In order to demagnetize the brake-magnets when no braking effect is desired, I provide an automatic switch, inclosed in a box M, the construction of which is as follows: $m$ is an electromagnet, one terminal of the coil of which leads to the trolley or otherwise connects with the source of current employed for actuating the motors by means of a conductor O, the other terminal of the coil being connected with the conductor O', leading to the blow-out magnet K, and the latter being connected to the contact T by a conductor O².

Pivotally mounted longitudinally in the box M is a bar H, which has fastened to its under side a transversely-extending bar or plate H'. One end of the bar H' is provided with an armature $a$, which is directly over the magnet $m$, and the other end of said bar is connected to the bottom of the box M by means of a coiled spring $s$, which serves to hold the armature $a$ out of contact with the poles of the magnet $m$ when the latter is not energized. The bar H is provided at one end with a contact plate or strip $i$, which extends transversely in both directions, and at its opposite end with a similar plate or strip $i'$. The end of the box M corresponding to the strip $i$ is provided with terminals $t\ t^2\ t^4$, the terminal $t$ being permanently connected to the contact-strip $i$ and the terminals $t^2\ t^4$ projecting inside the box in such position as to be engaged by the corresponding ends of the strip $i$. The other end of the box is provided with similar terminals $t'$, $t^3$, and $t^5$, which are correspondingly related to the strip $i'$.

The relation of the circuits and the operation of the apparatus are as follows, reference being had to Fig. 4 of the drawings in connection with the preceding figures: Assuming that the controller-drum is rotated to bring the main stationary contacts into position 1 and the contacts P into engagement with the contacts L, the magnet $m$ of the demagnetizing-switch will attract its armature $a$, and thus rock the bar H to separate the strips $i$ and $i'$ from the terminals $t^4$ and $t^5$ and bring them into engagement with the terminals $t^2$ and $t^3$. The circuits of the brake-magnets M' and M² will thus be broken and the conductors $d$ and $d'$ inserted in lieu thereof. In this position the two motors will be in series with all of the resistance R in circuit, the path traversed by the current being as follows: through conductor O, magnet-coil $m$, conductors O' and O², contact-finger T, contact-strips $x$ and $x^9$, contact-finger R², resistance-sections $r$, $r'$, $r^2$, $r^3$, and $r^4$, conductors O³ and O⁷, contact-finger $l'$, contact-strips $p'\ p^5$, finger $l^5$, field-magnet winding F', finger $l^3$, strips $p^3$ and $p^4$, finger $l^4$, armature A', switch-terminal $t$, plate $i$, terminal $t^2$, conductor $d$, conductor O⁴, finger C, conductor O⁵, finger C³, strips $x^{12}$ and $x^{13}$, finger C', conductor O⁶, finger $l^7$, field-magnet winding F², finger $l^2$, strips $p^2$ and $p^6$, finger $l^6$, armature A², switch-terminals $t'$, plate $i'$, terminal $t^3$, conductor $d'$, and finger G to ground. It will be readily seen without tracing the circuits in detail that when the main drum is turned to bring the main contact-fingers into position 2 the sections $r$ and $r'$ of the resistance R are short-circuited, the other portions of the resistance and the motors remaining in series. In position 3 the resistance-sections $r$, $r'$, and $r^2$ are short-circuited, leaving the remaining resistance-sections and the two motors in series. In position 4 all of the sections of the resistance except $r^4$ are short-circuited and that section and the two motors are in series. In position 5 all of the resistance is cut out or short-circuited, leaving the two motors in series without resistance. In position 6 the resistance-section $r^4$ is reinserted. In position 7 resistance-sections $r^2$, $r^3$, and $r^4$ are inserted and motor A² F² is cut out. Position 8 is the same as position 7. In position 9 resistance-sections $r$ and $r'$ are cut out, the two motors being connected in parallel with the remaining portion of the resistance in circuit, the path traversed by the current being as follows: through conductor O, magnet-coil $m$, conductors $O'$ and $O^2$, finger T, strips $x$ and $x^8$, finger $R^4$, resistance-sections $r^2$, $r^3$, and $r^4$, finger $R^7$, and conductor $O^3$ to finger $C^2$. From finger $C^2$ one path is through strips $x^{12}$ and $x^{13}$, finger $c'$, conductor $O^6$, finger $l^7$, field-magnet winding $F^2$, finger $l^2$, strips $p^2$ and $p^6$, finger $l^6$, armature $A^2$, switch-terminal $t'$, plate $i'$, terminal $t^3$, and conductor $d'$ to ground contact-finger G, and the other path is through conductor $O^7$, finger $l'$, strips $p'$ and $p^5$, finger $l^5$, field-magnet winding $F'$, finger $l^3$, strips $p^3$ and $p^4$, finger $l^4$, armature $A'$, switch-terminal $t$, plate $i$, and terminal $t^2$, conductors $d$ and $O^4$, finger C, strips $x^{15}$ and $x^{17}$ to ground contact-finger G. Position 10 is the same as position 9. Position 11 differs only in the short-circuiting of the additional section $r^2$ of the resistance. In position 12 all of the resistance except the portion $r^4$ is short-circuited, and in position 13 the motors are in parallel with all of the resistance cut out or short-circuited, this being the final running position on the power side.

In order to stop the car, the controller-drum is reversed until the main stationary contact-fingers are in position A and the contact-fingers $B'$ are in engagement with contact-strips L. As soon as stationary contact-finger T leaves position 1 in the reverse movement of the drum the magnet $m$ of the demagnetizing-switch will be deënergized and the spring $s$ will throw the strips $i$ and $i'$ into contact with terminals $t^4$ and $t^5$, so that when position A is reached the brake-magnets $M'$ and $M^2$ will be respectively in circuit with motors $A'$ $F'$ and $A^2$ $F^2$.

When the main stationary contact-fingers are in position A, all of the resistance R is in the local circuit, which includes the motors and brake-magnets, as will be readily seen by referring to Fig. 4. The momentum of the car acquired from the motors or by reason of a downgrade, or both, will now serve to drive the motors as generators and each will energize its brake-magnet to a degree determined by the speed of rotation of the armature and the amount of resistance in circuit, the current generated by armature $A'$ traversing conductor $O^8$, switch-terminal $t$, plate $i$, terminal $t^4$, brake-magnet $M'$, conductor $O^4$, finger C, strips $x^{16}$ and $x^{18}$, and finger G, and the current generated by armature $A^2$ traversing conductor $O^{11}$, switch-terminal $t'$, plate $i'$, terminal $t^5$, brake-magnet $M^2$, and finger G. From finger G a single path is provided through conductors $O^9$ and $O^{10}$, finger B, strips $x^{11}$ and $x^{10}$, finger $R^2$, resistance-sections $r$, $r'$, $r^2$, $r^3$, and $r^4$, finger $R^7$, conductors $O^3$ and $O^7$ to finger $l'$. From this point two paths are provided, one being through strips $b'$ and $b^2$, finger $l^2$, field-magnet winding $F^2$, finger $l^7$, strips $b^7$ and $b^6$, and finger $l^6$ to armature $A^2$, and the other through strips $b'$, $b^2$, and $b^3$, finger $l^3$, field-magnet winding $F'$, finger $l^5$, strips $b^5$ and $b^4$, and finger $l^4$ to armature $A'$. A further braking effect is produced by moving the controller-drum to bring the main contact-fingers to position B, and thus short-circuiting the resistance-section $r$. In position C resistance-sections $r$, $r'$, and $r^2$ are short-circuited, and in position E all of the resistance except the portion $r^4$ is short-circuited. In position F none of the resistance is in circuit, this being the maximum or emergency braking position.

In the last-named position the respective paths for the armature-currents to the finger G are the same as when the controller is in position A, and the single path from this point is through conductors $O^9$ and $O^{10}$, finger B, strips $x^{11}$ and $x^2$, and finger $R^7$, and thence as specified for position A.

It will be readily seen that each armature normally supplies current to its own brake-magnet only and that if the conditions are such as to stop the rotation of either armature the other armature will send a demagnetizing-current through the brake-magnet corresponding to the non-rotating armature, and thus effect the release of the corresponding truck-wheels, as has already been pointed out.

I desire it to be understood that my invention is in no wise limited as regards structural details or the relative location of the apparatus employed.

I claim as my invention—

1. In an electric braking apparatus, a plurality of electric motors arranged in parallel in a local circuit to be driven as generators, in combination with a plurality of brake-magnets, one in each branch of such circuit.

2. In an electric braking apparatus, a plurality of electric motors arranged in parallel in a local circuit to be driven as generators, in combination with a plurality of brake-magnets—one in each branch of such circuit—and means for automatically cutting both of said magnets out when the motors are connected with the main generator.

3. Means for propelling and regulating the speed of vehicles comprising a plurality of electric motors, means for connecting the same either in series or in parallel and for varying the resistance of their circuit or circuits, means for connecting the motors in parallel in a local circuit to be driven as generators by the momentum of the vehicle when the power-current is shut off, and a brake-magnet located in each branch of said local circuit.

4. In an electrically-propelled vehicle, the combination with a plurality of motors driven as generators by the momentum of the vehicle when the power-current is shut off, of means for establishing a local circuit which includes said motors in parallel and a variable resistance, a brake-magnet in each branch of such local circuit and means for progressively cutting out or short-circuiting the resistance.

5. In an electrically-propelled vehicle, the combination with a plurality of motors which are driven as generators by the momentum of the vehicle when the power-current is shut off, of means for establishing a local circuit having parallel branches through said motors, equalizing connections for said motors, a brake-magnet in each branch and means for varying the resistance of the circuit.

6. The combination with a vehicle, a plurality of electric motors for propelling the same and means for controlling their power and speed, of a plurality of brake-magnets normally out of circuit, and means for establishing a local circuit containing a variable resistance and having a plurality of branches each of which contains one of the motors and one of the brake-magnets.

In testimony whereof I have hereunto subscribed my name this 20th day of October, A. D. 1897.

HARRY P. DAVIS.

Witnesses:
WESLEY G. CARR,
HUBERT C. TENER.